April 14, 1959 — G. A. STEWART — 2,882,170
COMBINED CANDY HOLDER AND TOY
Filed June 17, 1957

INVENTOR.
GEORGE A. STEWART
BY
ATTORNEY

United States Patent Office

2,882,170  
Patented Apr. 14, 1959

2,882,170
COMBINED CANDY HOLDER AND TOY

George Allen Stewart, Branchville, N.J.

Application June 17, 1957, Serial No. 666,063

6 Claims. (Cl. 99—180)

Certain types of candy are formed in the shape of a disk having a central hole therein and a number of pieces of this candy are stacked together and wrapped in foil and paper to form a cylindrical package. When it is desired to consume one or more pieces, the end of the package is opened and, after one or more pieces have been removed, the end of the package is reclosed by crushing the wrapping material against the remaining pieces. When the pack is put in a pocket pending further use, the remaining pieces are contaminated and they frequently fall out and soil the pocket.

It is therefore the object of the invention to produce a storage and display device for candies of this type into which the pieces of candy which are stored in a paper wrapper can be readily transferred and from which the pieces of candy can be removed for consumption, one or more at a time, without having to be touched by hand and whereby the remaining pieces are kept in a sanitary and readily accessible manner.

A still further object of the invention is to make the device in question easy to handle and attractive and more particularly to make it appealing to children who consume large quantities of such candies.

A still further object of the invention is to provide a device of this kind which is extremely inexpensive so as to encourage wide use thereof.

These and other objects are obtained by my invention as set forth in the following specification and illustrated in the accompanying drawings in which.

Figure 1:
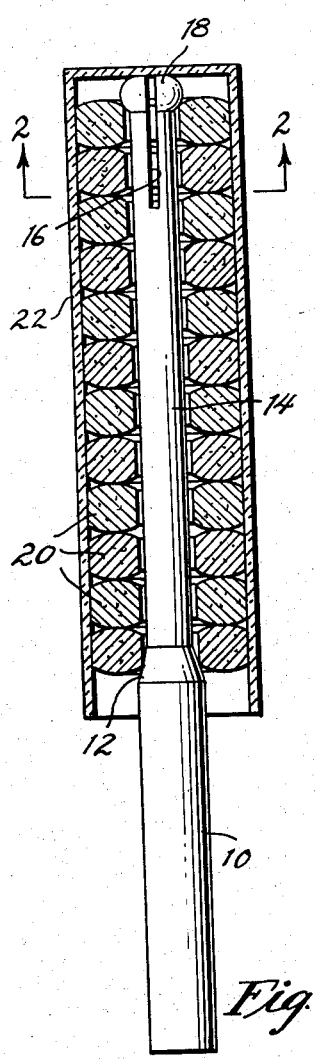
Fig. 1 is a vertical sectional view of one embodiment of the device.

In the embodiment of Fig. 1, the candy storing and supporting device includes a handle 10 of a diameter which is larger than the diameter of the hole in the candy to be mounted thereon and which tapers at 12 to form a cylindrical portion 14, the diameter of which is such as to permit the candy freely to slide thereon. The end of cylindrical portion 14 is slotted as at 16 and terminates in projections 18, the combined diameters of which are slightly bigger than the diameter of the hole in the piece of candy.

As stated, the candy pieces 20 are available on the market in a cylindrical paper package and to transfer them into cylindrical portion 14 of the device it is merely necessary to open one end of the package and to insert the upper slotted end of cylindrical portion 14 through the aligned holes of the packaged pieces of candy. Due to the presence of slot 16, the end projections 18 collapse towards each other so as to pass through the holes in the pieces of candy and after emerging through the other end of the paper package, the end projections 18 spread apart so as to prevent the pieces of candy falling off. The pieces of candy are now located between projections 18 and tapering portion 12 of the handle. With the candy in position the rest of the paper wrapper is removed, and in order to protect and enclose the candy, a tubular member 22, which is preferably made of non-breakable transparent material, is slipped over the candy. The parts will now be in the position shown in Fig. 1, and when it is desired to consume a piece of candy, the cover 22 is removed and with the hand, or with the lips, the end piece of candy can be slipped off.

Figure 3:
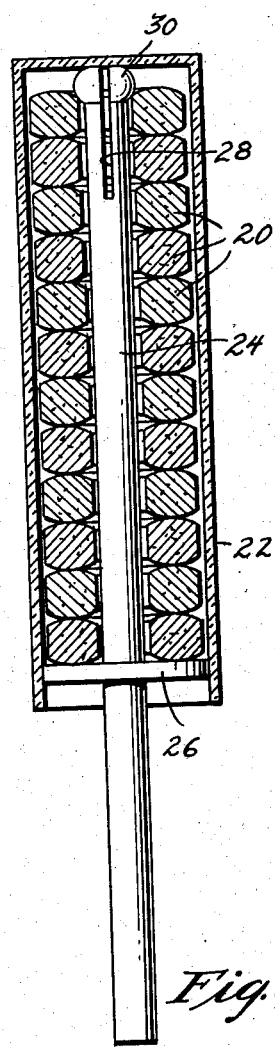
Fig. 3 is a vertical sectional view of a second embodiment of the invention.

In the embodiment of Fig. 3, a handle 24 is used which is of uniform diameter and the end of which is slotted as at 28 and terminates in rounded projections 30. Parts 24, 28 and 30 correspond to parts 14, 16 and 18 of Fig. 1, the only difference between the embodiment of Fig. 3 and Fig. 1 being that conical portion 12 of Fig. 1 is replaced by a disk 26 which is fixed on the handle.

The embodiment of Fig. 4 differs from the embodiment of Fig. 3 in that a U-shaped handle 32 is substituted for that portion of the handle which is below disk 26 in Fig. 3.

Figure 5:
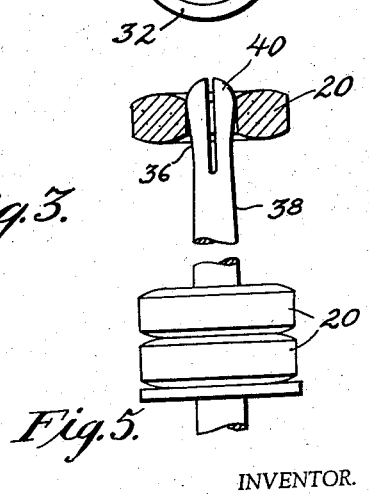
Fig. 5 is a fragmentary view partly in elevation and partly in section, showing a fourth embodiment of the invention.

In the embodiment of Fig. 5, the upper end of the candy supporting portion is tapered as at 38 and retaining projections are tapered as at 40. By this arrangement, if the stick is flicked, the outermost piece of candy will move outwardly along tapered portion 38, and will be arrested by projections 40 about as shown in Fig. 5. By this arrangement the outermost piece of candy is spaced from the remaining pieces and may be removed individually and without touching the next piece.

The device described enables a child to carry and consume the candy while playing, watching a movie, or doing something else, without dirtying his hands and without contaminating the candy. This is due to the fact that the candy need not be touched by hand at any time, not even while it is being transferred from its original paper package onto the stick.

Figure 4:
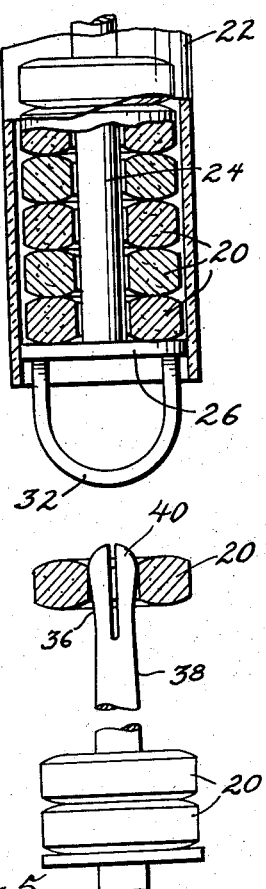
Fig. 4 is a fragmentary view partly in elevation and partly in section showing a third embodiment of the invention.
Figure 2:
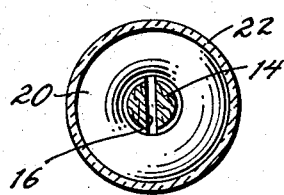
Fig. 2 is a section on line 2—2 on Fig. 1.

With respect to the embodiments of Figs. 3 and 4, I wish to point out that the cover 22 preferably tightly engages disk 26 so that it keeps the candy in a sanitary condition and so that, after the candy has been consumed, the device can be used as a pop gun. In other words, the child can hold the cover with one hand and pull the stick out with the other, and when disk 26 is pulled out, it will make a sound like a pop gun.

What I claim is:

1. A candy storing, displaying and dispensing package, a number of pieces of candy each having a central hole therethrough, an elongated member, the diameter of which is smaller than the diameter of said hole, means at one end of said elongated portion to limit the movement of said pieces relative thereto, and projections at the other end of said member and having an over-all size larger than the diameter of said opening, the end portion of said member being slotted at, and inwardly of, said projections to permit said projections to come into abutment with each other whereby said projections may be inserted through the openings in said pieces of candy and whereby, after passing through said pieces of candy, said projections spring apart to prevent said pieces of candy from falling off said member.

2. The structure recited in claim 1 in which the end portion of said member immediately inwardly of said projections is tapered in the direction of said projections.

3. The structure recited in claim 1 in which the longitudinal axis of said projections is longer than their transverse axis.

4. A candy storing, displaying and dispensing package including a number of pieces of candy each having a central hole therethrough, an elongated member passing through the holes in said pieces of candy, a fixed enlargement at one end of said member to prevent said pieces of candy from slipping off said end of said member and a compressible enlargement at the other end of said member, said compressible enlargement being such that, when compressed, it will pass through the holes in the pieces of candy and, when released, it will prevent the said pieces of candy from falling off said elongated member.

5. The structure recited in claim 4 and a cover removably carried by said member for enclosing the portion of said member which carries the candy.

6. The structure recited in claim 4 in which said cover is transparent.

References Cited in the file of this patent
UNITED STATES PATENTS

| | | |
|---|---|---|
| 1,800,459 | Maclean | Apr. 14, 1931 |
| 2,072,327 | Friedman | Mar. 2, 1937 |
| 2,626,199 | Knowles | Jan. 20, 1953 |